(12) United States Patent
Dayama et al.

(10) Patent No.: US 10,732,605 B2
(45) Date of Patent: Aug. 4, 2020

(54) DYNAMICALLY CONTROLLED CURVED SOLAR REFLECTORS FOR FLEXIBLE PHOTOVOLTAIC GENERATION

(71) Applicant: International Business Machines Corporation, Armonk, NY (US)

(72) Inventors: Pankaj S. Dayama, Bangalore (IN); Shivkumar Kalyanaraman, Bangalore (IN); Sukanya Randhawa, Bangalore (IN); Nitin Singh, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 283 days.

(21) Appl. No.: 15/826,225

(22) Filed: Nov. 29, 2017

(65) Prior Publication Data
US 2019/0163160 A1    May 30, 2019

(51) Int. Cl.
*G02B 26/08* (2006.01)
*G05B 19/402* (2006.01)
(Continued)

(52) U.S. Cl.
CPC ....... *G05B 19/402* (2013.01); *G02B 26/0825* (2013.01); *G05B 19/406* (2013.01);
(Continued)

(58) Field of Classification Search
CPC .............. G05B 19/402; G05B 19/406; G05B 2219/37113; H02S 40/22; H02S 20/32; G02B 26/0825; G02B 5/10
(Continued)

(56) References Cited

U.S. PATENT DOCUMENTS

| 9,279,600 B2 | 3/2016 | Clair et al. |
| 2008/0210286 A1 | 9/2008 | Ball |

(Continued)

FOREIGN PATENT DOCUMENTS

WO    WO2016123195 A1    8/2016

OTHER PUBLICATIONS

Sujrathi, Ankit S. et al., "Testing and Performance of the Convex Lens Concentrating Solar Power Panel Prototype", International Journal of Emerging Technology and Advanced Engineering, Jun. 2014, 5 pages, vol. 4, Issue 6, IJETAE.
(Continued)

*Primary Examiner* — Euncha P Cherry
(74) *Attorney, Agent, or Firm* — Ference & Associates LLC (57) ABSTRACT

One embodiment provides a method, including: determining a light profile of light falling onto a solar module, wherein the light profile identifies (i) a position of the light with respect to the solar module and (ii) the intensity of the light with respect to solar panels within the solar module; identifying at least one solar panel within the solar module having partial light coverage; and changing the light profile by shaping the reflection of the light onto the solar module created by a flexible curved reflector in proximity to the solar module, thereby increasing the amount of light falling onto said at least one solar panel within the solar module; the changing the light profile comprising modifying the geometry of the flexible curved reflector by activating at least one actuator to move at least a portion of the flexible curved reflector.

20 Claims, 4 Drawing Sheets

(51) Int. Cl.
*H02S 40/22* (2014.01)
*G05B 19/406* (2006.01)
*G02B 5/10* (2006.01)

(52) U.S. Cl.
CPC .............. *H02S 40/22* (2014.12); *G02B 5/10* (2013.01); *G05B 2219/37113* (2013.01)

(58) Field of Classification Search
USPC ...................................... 359/223.1
See application file for complete search history.

(56) References Cited

U.S. PATENT DOCUMENTS

| | | |
|---|---|---|
| 2012/0285443 A1 | 11/2012 | Gandhi |
| 2012/0312349 A1 | 12/2012 | Farberov |
| 2014/0332073 A1 | 11/2014 | Chen et al. |
| 2016/0320684 A1* | 11/2016 | Galstian ................ G02F 1/29 |
| 2017/0022713 A1 | 1/2017 | Tandler |

OTHER PUBLICATIONS

Ciulla, Nicholas J., "Effects of a Convex Lens and Mirrors on Generation of Solar Power", American Association for the Advancement of Science, Feb. 12-16, 2015, San Jose, CA, USA, 1 page, AAAS.

Xiao, Gang, "Mirrors of dynamic curvature for linear solar concentrators", HAL, Feb. 29, 2012, 17 pages, HAL.

\* cited by examiner

DYNAMICALLY CONTROLLED CURVED SOLAR REFLECTORS FOR FLEXIBLE PHOTOVOLTAIC GENERATION

BACKGROUND

The world has significant energy needs. Energy is used to power everything from clocks and mobile devices to cars and buildings. Some energy needs are met through the use of energy storage devices, for example, batteries, accumulators, and the like. Other energy needs are met through the use of produced energy which is then directed to the power grid accessible by different energy consumers (e.g., homes, businesses, facilities, etc.). The energy needs for consumers varies throughout the day and night, and energy needs may be greater or less than what the power grid can provide. The energy providers adjust to this difference in demand by either increasing or by reducing the energy supplied to the power grid. One way to increase/reduce the energy supplied to the grid is to increase/decrease the amount of energy produced by energy producers (e.g., non-renewable energy power plants, renewable energy power producers, etc.).

During the day and night, the demand for energy can fluctuate, sometimes very quickly. Accordingly, the power plants are divided into base load power plants and peak load power plants. Base load power plants generally maintain a constant energy output that satisfies a minimum amount of energy demand. Typically, base load power plants are plants that have a constant energy supply, for example, nuclear power plants, coal power plants, and the like. The peak load power plants generally supply energy when there is a high demand for energy. Thus, peak load power plants are energy producers that are able to be stopped and started quickly. Additionally, power plants which do not have a constant energy supply (e.g., solar power, wind power, etc.) are typically used as peak load power plants, rather than base load power plants.

BRIEF SUMMARY

In summary, one aspect of the invention provides a method, comprising: utilizing at least one processor to execute computer code that performs the steps of: determining a light profile of light falling onto a solar module, the solar module comprising a plurality of solar panels, wherein the light profile identifies (i) a position of the light with respect to the solar module and (ii) the intensity of the light with respect to solar panels within the solar module; identifying, from the light profile, at least one solar panel within the solar module having partial light coverage; and changing the light profile by shaping the reflection of the light onto the solar module created by a flexible curved reflector in proximity to the solar module, thereby increasing the amount of light falling onto said at least one solar panel within the solar module; the changing the light profile comprising modifying the geometry of the flexible curved reflector by activating at least one actuator to move at least a portion of the flexible curved reflector.

Another aspect of the invention provides an apparatus, comprising: at least one processor; and a computer readable storage medium having computer readable program code embodied therewith and executable by the at least one processor, the computer readable program code comprising: computer readable program code that determines a light profile of light falling onto a solar module, the solar module comprising a plurality of solar panels, wherein the light profile identifies (i) a position of the light with respect to the solar module and (ii) the intensity of the light with respect to solar panels within the solar module; computer readable program code that identifies, from the light profile, at least one solar panel within the solar module having partial light coverage; and computer readable program code that changes the light profile by shaping the reflection of the light onto the solar module created by a flexible curved reflector in proximity to the solar module, thereby increasing the amount of light falling onto said at least one solar panel within the solar module; the changing the light profile comprising modifying the geometry of the flexible curved reflector by activating at least one actuator to move at least a portion of the flexible curved reflector.

An additional aspect of the invention provides a computer program product, comprising: a computer readable storage medium having computer readable program code embodied therewith, the computer readable program code executable by a processor and comprising: computer readable program code that determines a light profile of light falling onto a solar module, the solar module comprising a plurality of solar panels, wherein the light profile identifies (i) a position of the light with respect to the solar module and (ii) the intensity of the light with respect to solar panels within the solar module; computer readable program code that identifies, from the light profile, at least one solar panel within the solar module having partial light coverage; and computer readable program code that changes the light profile by shaping the reflection of the light onto the solar module created by a flexible curved reflector in proximity to the solar module, thereby increasing the amount of light falling onto said at least one solar panel within the solar module; the changing the light profile comprising modifying the geometry of the flexible curved reflector by activating at least one actuator to move at least a portion of the flexible curved reflector.

A further aspect of the invention provides a method, comprising: utilizing at least one processor to execute computer code that performs the steps of: determining a light profile of light falling onto a solar module, the solar module comprising a plurality of solar panels, wherein the light profile identifies (i) a position of the light with respect to the solar module and (ii) the intensity of the light with respect to solar panels within the solar module; identifying, from the light profile, an azimuth effect with relation to the solar module, wherein the azimuth effect results in light being reflected onto the solar module from a reflector, resulting in one or more solar panels having partial light coverage; and reflecting diffused radiation onto the solar module to reduce the azimuth effect by adjusting, using at least one actuator, the geometry of a curved flexible curved reflector in proximity to the solar module to capture diffuse radiation and shape light shining onto the solar module.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

The increase in a desire to decrease the carbon footprint and decrease pollution, especially as produced by energy generation facilities, has made renewable energy sources (e.g., wind, water, solar, etc.) crucial. Particularly, renewable energy sources (e.g., wind, water, solar, etc.) are widely regarded as being important to the future of energy generation. However, due to the instability and volatility of some renewable energy sources, the power plants using those energy sources may only be used to assist in meeting peak demand loads. Additionally, since the power production of these renewable energy sources is directly dependent on an uncontrollable force (e.g., sunlight, wind, waves, etc.), it may be difficult to ensure maximum production and to consistently produce a requested power output.

In order to account for this volatility the power generation from an energy producer using renewable energy sources may be curtailed, meaning that the requested output power will be less than the actual amount of power that can be produced by the facility. Such a technique helps to ensure that the forecasted amount of power needed by the power grid will be able to be met using all energy producers within the power grid. However, one problem with this is that any excess energy produced by the facility will be wasted or may be stored in on-site energy storage facilities, which increases the reliance on the non-renewable energy producers. An additional problem is that produced energy ends up being wasted.

Since the production of solar energy is directly dependent on the amount of sunlight, a solar energy system may experience sharp and quick increases and decreases in the amount of energy that can be generated. For example, photovoltaic output may drop by 80% within a few seconds. Such sudden and dramatic increases and decreases can impact the electromechanical dynamics of the system which may create severe frequency oscillations. This may lead to malfunctions of the protections systems and may trigger cascading failures or massive blackouts.

A solar energy generation system may also suffer from mid-term volatility where the solar photovoltaic output may change over the course of a few minutes to a few hours. For example, the photovoltaic output may change due to cloud movements or temporary shadow effects. For example, during cloud cover the sunlight received by the photovoltaic panels is dramatically reduced as compared to when there is no cloud cover. Additionally, the amount of sunlight received by the photovoltaic panels varies throughout the day due to the different angles at which the sunlight hits the photovoltaic panels. At different angles the sun hits the photovoltaic panels less directly and therefore the amount of irradiance received by the surface of the photovoltaic panel varies. Irradiance is the radiant flux, or power, received by a surface per unit area. Each photovoltaic panel has an optimal angle and orientation that most efficiently utilizes the irradiance. However, this angle and orientation vary as the sun angle varies throughout the day. The mid-term volatility impacts the load following capability of the grid and increases the required spinning reserve capacity. It can also create huge power swings in the grid which may lead to voltage collapse.

A solar energy generation system may also suffer from long term volatility. The amount of sunlight that will be available, and thus the amount of photovoltaic output that is possible, can be difficult to predict. Since energy providers need to bid in real time as well as for future energy generation (e.g., a day ahead, a week ahead, etc.), it can be difficult to accurately predict the amount of photovoltaic output that will be produced by the facility. If the energy generation facility is unable to meet the bid commitment, the facility may need to pay high penalties.

One technique for reducing the effect of the volatility of the solar energy production is to make the power production from the solar modules more stable, specifically by increasing the production of the solar modules to a maximum output value. In an effort to increase production, reflectors have been added to the solar modules. The reflectors can then be controlled to reflect sunlight onto the solar modules, thereby increasing the fraction of the solar module that receives sunlight, particularly when the angle of the sun is such that portions of the module may not receive the sunlight without the reflector. However, there are some problems with the current reflector additions.

Typically the reflectors added to the solar modules are flat reflectors. The problem with a flat reflector is that as the light is reflected from the reflector to the solar module, the reflection does not cover the solar module. Specifically, the flat reflectors suffer from the azimuth effect, where the reflected light is reflected at an angle from the solar module, thereby resulting in solar panels within the module receiving partial or no illumination. The surface area of the solar module that is non-illuminated or partially illuminated varies as the angle of the sun changes. Accordingly, the flat reflector cannot be positioned in such a manner that will result in the entirety of the solar module being illuminated at all times. One technique to solve this problem is to put the reflectors on track systems or other devices that allow the reflector to be moved or adjusted throughout the day as the sun angle changes. However, this only allows the reflection from the reflector to be moved from one location to another, but does not eliminate the azimuth effect.

Additionally, the flat reflectors are unable to accurately reflect, onto the solar module, diffused radiation that is produced by sunlight being scattered by molecules within the atmosphere. The amount of diffused radiation varies with the time of year, but can be as high as 50%-70% of the total irradiation. Even if a flat reflector is able to reflect some diffused radiation, the geometry of the flat reflector results in most of the diffused radiation being reflected onto a surface other than the solar module, due to the fact that the angular distribution of diffused irradiance shows that most of the diffuse radiation is incident from the top of the reflector.

Another problem with current reflectors is that the reflection of the sunlight onto the solar module is indiscriminate, which means that the solar module can suffer from hot spots, or areas of the solar module that receive a greater intensity of sunlight than other areas. The problem with these hot spots is that the temperature of the solar panel at the hot spot may increase to a temperature greater than the rated or warranty temperature. In other words, the hot spots may cause damage to the solar panels by increasing the temperature of the solar panel to an unsafe temperature.

Accordingly, the techniques and systems as described herein provide for dynamic modification of the geometry of a flexible reflector which in turn changes the light profile onto the solar module. The terms "reflector" and "photonic harvester" will be used interchangeably throughout this disclosure. The reflector or photonic harvester will be described in more detail below, but includes a portion of the overall system that does not collect solar energy to be converted to power as with a solar module or solar panel, but instead reflects sunlight from one position to another position, for example, onto the solar module. The term solar module will be used herein to refer to a configuration or module that is made up of a plurality of solar panels.

The system determines a light profile of light onto the solar module. The light profile includes reflected irradiance produced by a reflector reflecting radiation onto the solar module. The light profile may also include direct radiation from sunlight shining directly onto the solar module. The light profile not only identifies a position of the light with respect to the solar modules and solar panels within the solar module, but also identifies the intensity of the light shining onto each of the solar panels. From the light profile, the system identifies one or more solar panels within the solar module that are not illuminated or only partially illuminated. In other words, the system identifies one or more solar panels that have no or partial light coverage.

The reflector in proximity to the solar modules comprises a flexible curved reflector. This flexible curved reflector may be used alone or in addition to other reflectors, for example, the flexible curved reflectors may be attached to the edges or sides of a traditional flat reflector. In order to correct the partial light coverage of one or more solar panels or to manage additional solar irradiance spread of the solar module, the system changes the light profile by modifying the curvature or the geometry of the reflector using one or more actuators. As the geometry of the reflector is modified, the light reflected onto the solar module by the reflector is directed to illuminate more of the solar module than was previously illuminated. Modifying the geometry of the reflector allows for diffused radiation to reflect onto the solar module. Additionally, since the reflector allows shaping of the light reflected onto the solar module, the system can change the geometry of the reflector to compensate for hot spots on the solar modules. As the geometry of the reflector is modified, feedback is received from the system indicating whether the new light profile provides for complete illumination of the solar module.

Such a system provides a technical improvement over current solar harvesting systems. The systems and methods described herein provide a system and technique for dynamically changing the light profile onto a solar module produced by a flexible reflector. Modifying the geometry of the flexible reflector results allows for shaping the light reflecting onto the solar module. Such a system allows for reduction or elimination of the azimuth effect, thereby resulting in a solar module that can produce more power than using a traditional reflector. Additionally, since the reflector is a curved reflector, the reflector is able to capture diffused radiation and direct the diffused radiation onto the solar module unlike traditional flat reflectors. The system also provides for a mechanism to assist in reducing hot spots, thereby reducing the temperature onto the solar panels which assists in meeting panel warranty thresholds. Since the system can be dynamically adjusted, the output of the solar module can be controlled to be consistent and can be adjusted in response to changing weather or output request conditions. Additionally, the system provides a system and technique for optimizing the power production from a module or a series of modules.

Figure 1:
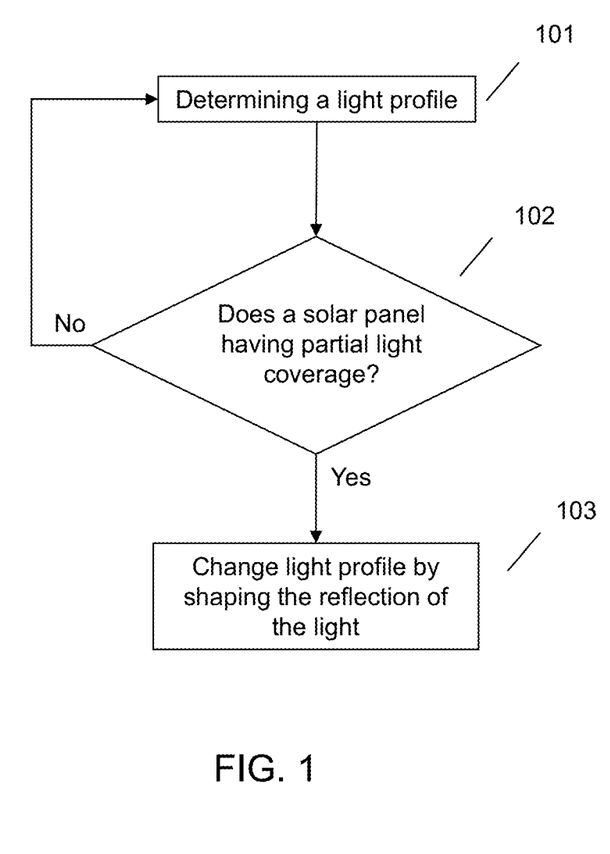
FIG. 1 illustrates a method of changing the geometry of a flexible reflector to modify a light profile.

FIG. 1 illustrates a method for dynamically changing the light profile onto a solar module by modifying the geometry of one or more curved flexible reflectors in proximity to the solar module. In FIG. 1, at 101, the system determines a light profile of light onto a solar module that includes a plurality of solar panels. The light profile may identify the shape, outline, or location of the sunlight with respect to the solar module and/or solar panels of the solar module. The light profile includes reflected light (i.e., light reflected onto the solar module by another object, for example, a reflector), but may also include direct light (i.e., light from the sun shining directly onto the solar module). Additionally, the light profile may not only identify the position of the light onto the solar module with respect to each solar panel and but may also identify the value of irradiance or intensity of the light onto each panel of the solar module.

Determining the light profile may include receiving information related to a shadow on the solar module. The information related to the shadow may be received from one or more sensors or devices attached to or otherwise connected to the solar module. For example, the solar module may include one or more light or optical sensors that can detect light or the intensity of light onto one or more portions of the solar module. As another example, the solar module may include one or more temperature sensors that can detect a temperature difference on the solar module that might be caused by a shadow. Other sensors or devices may include inverters, cameras, orientation sensors, power output, or the like.

Additionally or alternatively, the system may receive input from other sensors or input parameters that are separate from the solar module. For example, the system may receive input from weather information that indicates cloud coverage. As another example, the system may identify an angle of the sun. Using the angle of the sun, the system may be able to determine a possible shadow that may be caused by geographic features in proximity to the solar module. As a final example, the system may include feed from one or more image capture devices that can be used to identify any shadows that may be covering one or more portions of the solar module. The system may also take into account the geographic location of the solar module, geographic features in proximity to the solar module, orientation of the solar module, or the like. The shadow may also be a calculated or expected shadow. For example, the system may, based upon different parameters of the solar module and expected weather conditions, determine that a shadow is expected to at least partially cover the solar module at a particular time of day. Accordingly, the shadow determination can be determined in advance, in real-time, or a combination thereof.

Determining the light profile may also include determining the azimuth effect of the solar module. The azimuth effect is the effect that occurs from a reflection from the reflector being reflected onto the solar module at an angle, thereby causing portions of the solar module to be either not illuminated or partially illuminated. The azimuth effect can be calculated or determined from the location of the solar module, the position of the sun in the sky, and the expected reflection of the reflector. The azimuth effect may be calculated in both real-time and in advance. For example, using geographical location of the solar module, solar calculations, geometry of the panels, orientation of the panels, and/or additional inputs the system may calculate an expected azimuth effect for the next hour, the next day, or even the next year. The azimuth calculation or expected azimuth effect may also be based, in part, on historical azimuth effects.

At 102 the system may determine whether one or more solar panels within the solar module have partial or no light coverage. In other words, the system may determine whether one or more of the solar panels are not illuminated or partially illuminated. The term partially illuminated or partial light coverage will be used here throughout. However, it is intended that this term also includes solar panels that are not illuminated or have no light coverage. This determination may be based upon the light profile input. Using the light profile, the system can determine the location of the solar panels within the solar module that may be partially illuminated. The light profile may also be used to identify the intensity of the light at a particular point or solar panel within the solar module, which may be useful for identifying hot spots on the solar module, as explained in more detail below.

If the system determines that all solar panels are illuminated and there are no hot spots, the system may continue to monitor the light profile at 101. If, however, the system identifies either a solar panel having partial illumination or a hot spot on the solar module, the system may change the light profile, at 103, by shaping the reflection of the light onto the solar module from one or more flexible curved reflectors in proximity to the solar module. Shaping the reflection of the light may include shaping the light that is produced by the reflector or photonic harvester. In other words, changing the light profile may include shaping the additional light that is reflected onto the solar module by the reflector or photonic harvester and not shaping the light that is directed onto the solar module from another source. Shaping the reflection of the light may include modifying the curvature or the geometry of the flexible curved reflector using one or more actuators to move at least a portion of the flexible curved reflector.

The system may also identify that the light profile needs to be modified based upon a requested or expected power output of the solar module. A cognitive engine may use different factors to determine whether the light profile needs to be adjusted to meet the requested or expected power output. For example, the cognitive engine may receive input from weather forecasts, power market pricing, hot spot detection, and the like. As an example, the cognitive engine may receive input related to hourly, daily, weekly, or the like, irradiance forecasts to make long-term decisions on power output or generation by one or more solar modules. The cognitive engine may also take into account power market pricing to maximize revenue potential, for example, by increasing power generation when the market pricing is high. Additionally, as discussed in more detail herein, the cognitive engine may take into account temperature measurements across the solar modules to reduce hot spots.

To determine how the geometry of the reflector should be modified, the light profile or inputs of the light profile may be input to a reflector optimization engine. Also provided as input to the reflector optimization engine is the current configuration and size of the reflector. An additional input that may be provided to the reflector optimization engine is a power optimizer input. The power optimizer may identify which solar panels or modules within a series of modules should be addressed for boosting the power output by the solar panel or module. Since the solar panels within a solar module are electrically connected together in series, if one solar panel is producing a lower power output than other solar panels within the string, the overall output power of the string is limited by the solar panel producing the least amount of power. Therefore, the system may focus on increasing the irradiance to that panel in order to boost the overall power output from the solar module. In other words, while an ideal system would boost power to all solar panels that are not producing at peak power, this may not be possible due to geometry, orientation, sun angle, and the like. Therefore, the system may identify one or more solar panels as priority panels using the power optimizer input. The solar panels that may be identified as priority panels may be the panels that would provide the greatest overall boost in power output by the solar module.

An additional input to the reflector optimization engine may be warranty threshold information. For example, the warranty for each solar panel may be based upon the solar panel staying below a particular temperature. As sunlight is reflected onto the solar module, hot spots can occur. The hot spots are the result of the sunlight being focused on a particular point on the solar module and increasing the temperature at this location. Accordingly, the system may take into account warranty information and temperatures of different locations on the solar module to determine if one or more panels is nearing or exceeding the temperature threshold. The temperature threshold may not only be based on warranty information. For example, a user or other person may provide input that the temperature at any point on the solar module should not exceed a particular temperature.

The reflector optimization engine may also use the time of day, date, geometry, orientation of the reflector and/or solar modules, location of the solar module and/or reflector, and the like, as input. Using the inputs, the reflector optimization engine may determine an ideal configuration and geometry for the reflector. The configuration and geometry of the reflector may include identifying a radius of curvature of the reflector, a distance of the reflector to the solar module, a tilt of the reflector with respect to the solar module, and the like. Based upon the determined configuration and geometry, one or more actuators may be actuated to change the geometry of the reflector and to adjust the orientation and/or location of the reflector.

Figure 2:
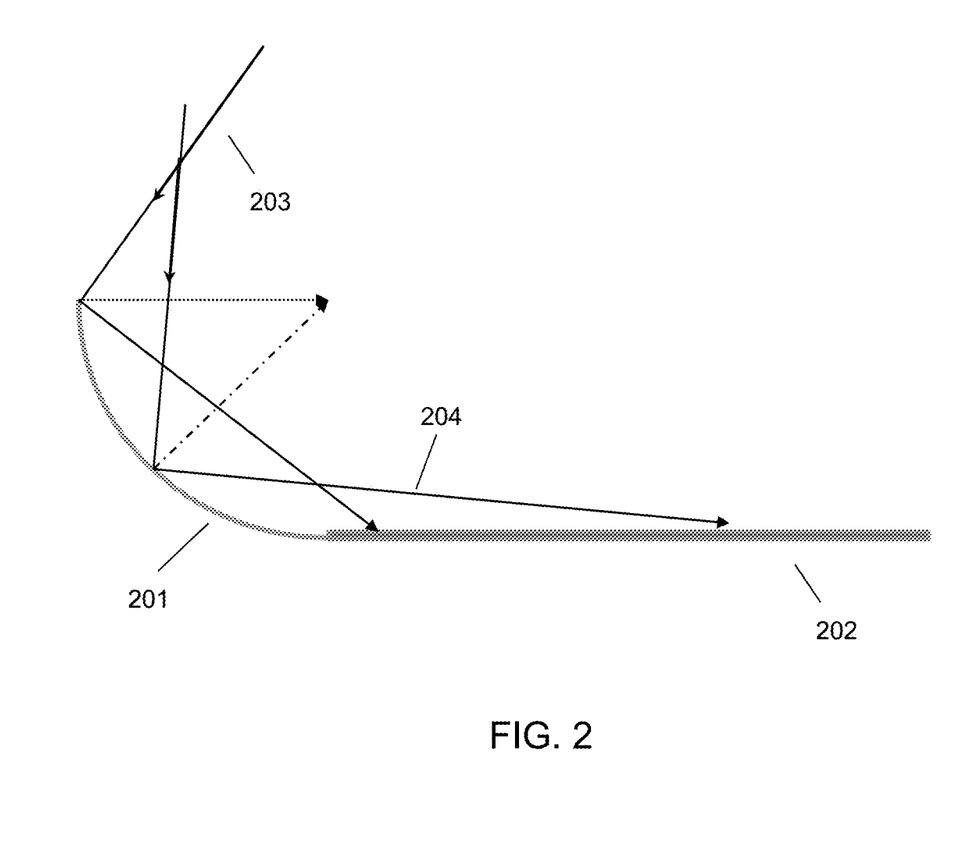
FIG. 2 illustrates an example concave reflector and diffused radiation pattern.
Figure 3:
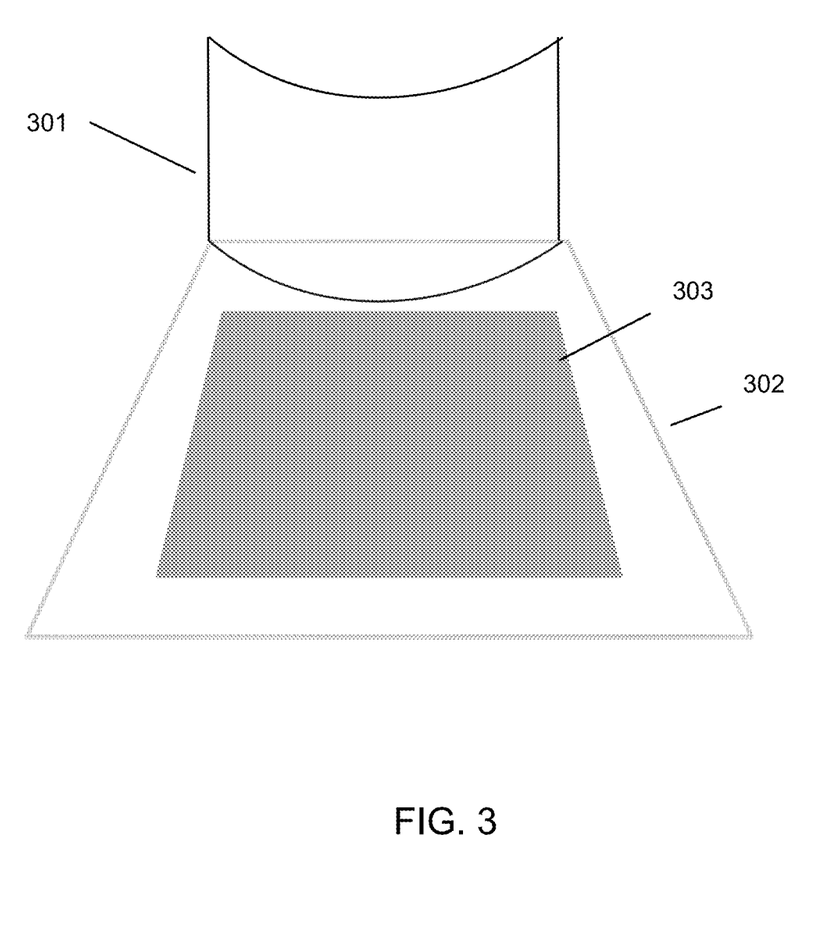
FIG. 3 illustrates an example convex reflector, solar module, and light profile.

Since the flexible reflector is a curved reflector, the modification of geometry may cause diffused radiation to reflect onto the solar module. For example, referring to FIG. 2, the curved reflector 201 reflects diffuse radiation 203 onto the solar module 202 as reflected diffuse radiation 204. The example shown in FIG. 2 illustrates a concave reflector 201. A concave reflector may allow for more diffuse radiation to be reflected onto the solar module. However, under conditions without as much diffuse radiation, an optimal geometric configuration may be a convex reflector, for example, as shown in FIG. 3. The convex reflector 301 can spread the incident light 302 onto the solar module 303. The light spreading can reduce or mitigate azimuth effects and may also assist in meeting the temperature threshold. Additionally, as seen in FIG. 3, the incident light 302 is spread onto an area larger than the solar module 303. Thus, the reflector may be smaller than the solar module or may be used to spread light across multiple solar modules, thereby reducing the cost of reflectors. Accordingly, one geometrical modification may include changing the geometry of the reflector from a convex to a concave configuration or vice versa depending on the light conditions.

To change the geometry and/or location of the reflector, the system may employ one or more actuators. The actuators may include electromechanical actuators that contain mechanical components, for example, compression springs, torsion springs, pistons, or the like. The actuators may also include linear bearings or guides that may include components such as ball bearings, roller bearings, or the like, that slide or roll over guides to move the reflector. Different actuators may be used to change different parameters of the reflector. For example, the electromechanical actuators including springs or pistons may be used to modify the geometry of the reflector, while bearings or linear motion systems may be used to modify the distance of the reflector to the solar module or change the tilt of the reflector.

Actuators for modifying the geometry of the reflector may be attached to one or more geometrical axes of the reflector. For example, one actuator may be positioned with respect to the reflector to facilitate movement of the reflector from a convex to concave geometry and one actuator may be positioned to facilitate movement of the reflector in the X or Y axis. It should be understood that more than one actuator may be located in the same geometrical axis of the reflector. For example, one actuator may be positioned perpendicular to the reflector surface at different positions of the reflector. This may allow for more refined movement of the reflector, for example, by moving only a portion of the reflector in the Z direction while maintaining the rest of the reflector at the previous position in the Z direction. In other words, the actuators may be positioned such that the reflector may be configured as different shapes, for example, spherical, parabolic, hyperbolic, and the like.

The reflector optimization engine may also determine a distance of the reflector from the solar module and/or a tilt of the reflector with respect to the solar module. Both modification of the distance and/or tilt of the reflector may be accomplished using one or more actuators. The modification of not only the geometrical configuration of the reflector, but also the distance and the tilt of the reflector allows for a system that can shape the reflected light beam. Shaping the reflected light beams allows for management of the distribution of light onto the solar module, thereby reducing or eliminating the partially illuminated solar panels. Additionally, shaping of the reflected light provides a mechanism for reducing hot spots on the solar module Once the configuration of the reflector (e.g., geometrical shape, distance, tilt, etc.) has been modified, the system may receive feedback on the light profile that is generated by the new configuration. If the light profile still results in a system having partially illuminated solar panels and/or hot spots that can be accounted for using a new configuration, the system may adjust the configuration of the reflector to compensate for the deficiencies of the new light profile. Additionally, because the system receives real-time feedback, the system can dynamically change based upon changing weather conditions, requested power outputs, or the like. For example, if an unexpected cloud generates a shadow on the solar module, the system can change the reflector configuration to compensate for this new shadow. As another example, if the requested power output changes, the system may dynamically change the reflector configuration to assist in meeting the new power output request.

Figure 4:
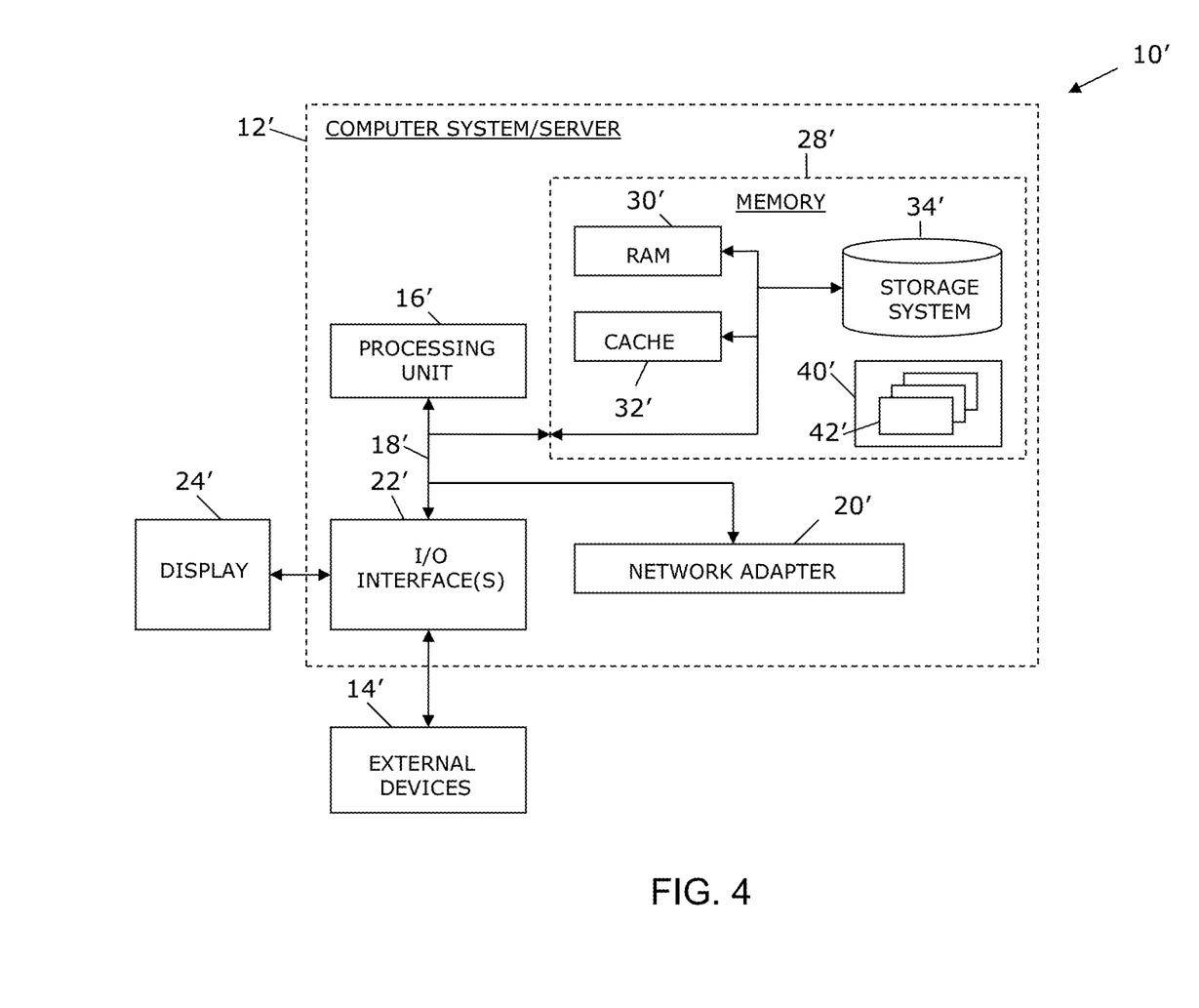
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA)

bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
determining a light profile of light falling onto a solar module, the solar module comprising a plurality of solar panels, wherein the light profile identifies (i) a position of the light with respect to the solar module and (ii) the intensity of the light with respect to the solar panels within the solar module;
identifying, from the light profile, at least one solar panel within the solar module having partial light coverage; and
changing the light profile by shaping the reflection of the light onto the solar module created by a flexible curved reflector in proximity to the solar module, thereby increasing the amount of light falling onto said at least one solar panel within the solar module;
the changing the light profile comprising modifying the geometry of the flexible curved reflector by activating at least one actuator to move at least a portion of the flexible curved reflector.

2. The method of claim 1, wherein the determining a light profile comprises identifying a shadow on the solar module.

3. The method of claim 1, wherein the determining a light profile comprises determining, using a location of the solar module, a position of the sun in the sky, and an expected reflection of the flexible curved reflector, the azimuth effect resulting in the at least one solar panel having partial light coverage.

4. The method of claim 1, comprising receiving, after changing the light profile, feedback relating to a new light profile caused by the changed light profile and adjusting the new light profile based upon the received feedback.

5. The method of claim 1, wherein the changing the light profile comprises modifying, using an actuator, the location of the flexible curved reflector by adjusting the distance of the reflector from the solar module.

6. The method of claim 1, wherein the changing the light profile comprises modifying, using an actuator, a tilt of the flexible curved reflector with respect to the solar module.

7. The method of claim 1, wherein the modifying the geometry comprises modifying the geometry between a convex geometry and a concave geometry.

8. The method of claim 1, wherein the modifying the geometry comprises modifying more than one geometrical axis of the flexible curved reflector.

9. The method of claim 1, comprising receiving a temperature measurement corresponding to a temperature of at least one of the solar panels.

10. The method of claim 9, comprising identifying at least one solar panel exceeding a predetermined temperature threshold and wherein the changing the light profile is based upon reducing the temperature of the at least one solar panel exceeding the predetermined temperature threshold.

11. An apparatus, comprising:
at least one processor; and
a computer readable storage medium having computer readable program code embodied therewith and executable by the at least one processor, the computer readable program code comprising:
computer readable program code that determines a light profile of light falling onto a solar module, the solar module comprising a plurality of solar panels, wherein the light profile (i) identifies a position of the light with respect to the solar module and (ii) the intensity of the light with respect to solar panels within the solar module;

computer readable program code that identifies, from the light profile, at least one solar panel within the solar module having partial light coverage; and computer readable program code that changes the light profile by shaping the reflection of the light onto the solar module created by a flexible curved reflector in proximity to the solar module, thereby increasing the amount of light falling onto said at least one solar panel within the solar module;

the changing the light profile comprising modifying the geometry of the flexible curved reflector by activating at least one actuator to move at least a portion of the flexible curved reflector.

12. A computer program product, comprising:

a computer readable storage medium having computer readable program code embodied therewith, the computer readable program code executable by a processor and comprising:

computer readable program code that determines a light profile of light falling onto a solar module, the solar module comprising a plurality of solar panels, wherein the light profile (i) identifies a position of the light with respect to the solar module and (ii) the intensity of the light with respect to solar panels within the solar module;

computer readable program code that identifies, from the light profile, at least one solar panel within the solar module having partial light coverage; and computer readable program code that changes the light profile by shaping the reflection of the light onto the solar module created by a flexible curved reflector in proximity to the solar module, thereby increasing the amount of light falling onto said at least one solar panel within the solar module;

the changing the light profile comprising modifying the geometry of the flexible curved reflector by activating at least one actuator to move at least a portion of the flexible curved reflector.

13. The computer program product of claim 12, wherein the determining a light profile comprises identifying a shadow on the solar module.

14. The computer program product of claim 12, comprising receiving, after changing the light profile, feedback relating to a new light profile caused by the changed light profile and adjusting the new light profile based upon the received feedback.

15. The computer program product of claim 12, wherein the changing the light profile comprises modifying, using an actuator, the location of the flexible curved reflector by adjusting the distance of the reflector from the solar module.

16. The computer program product of claim 12, wherein the changing the light profile comprises modifying, using an actuator, a tilt of the flexible curved reflector with respect to the solar module.

17. The computer program product of claim 12, wherein the modifying the geometry comprises modifying the geometry between a convex geometry and a concave geometry.

18. The computer program product of claim 12, wherein the modifying the geometry comprises modifying more than one geometrical axis of the flexible curved reflector.

19. The computer program product of claim 12, comprising receiving a temperature measurement corresponding to a temperature of at least one of the solar panels and identifying at least one solar panel exceeding a predetermined temperature threshold and wherein the changing the light profile is based upon reducing the temperature of the at least one solar panel exceeding the predetermined temperature threshold.

20. A method, comprising:

utilizing at least one processor to execute computer code that performs the steps of:

determining a light profile of light falling onto a solar module, the solar module comprising a plurality of solar panels, wherein the light profile identifies (i) a position of the light with respect to the solar module and (ii) the intensity of the light with respect to solar panels within the solar module;

identifying, from the light profile, an azimuth effect with relation to the solar module, wherein the azimuth effect results in light being reflected onto the solar module from a reflector, resulting in one or more solar panels having partial light coverage; and reflecting diffused radiation onto the solar module to reduce the azimuth effect by adjusting, using at least one actuator, the geometry of a curved flexible curved reflector in proximity to the solar module to capture diffuse radiation and shape light shining onto the solar module.

* * * * *